Oct. 27, 1970     R. J. BILLETT     3,536,317
WEB MATERIAL INTERFOLDING AND CUTTING MACHINE

Filed April 6, 1967     5 Sheets-Sheet 1

INVENTOR.
RONALD J. BILLETT

BY

*Francis W. Anderson*
ATTORNEY

FIG_4

FIG_12

FIG_7

FIG_8

INVENTOR.
RONALD J. BILLETT

BY Francis W. Anderson
ATTORNEY

United States Patent Office 3,536,317
Patented Oct. 27, 1970

3,536,317
WEB MATERIAL INTERFOLDING AND CUTTING MACHINE
Ronald J. Billett, Sunnyvale, Calif., assignor to FMC Corporation, San Jose, Calif., a corporation of Delaware
Filed Apr. 6, 1967, Ser. No. 628,892
Int. Cl. B65h 45/22
U.S. Cl. 270—40
16 Claims

ABSTRACT OF THE DISCLOSURE

A folder in a machine 'for producing interleaved napkins receives two running webs, each web formed of side-by-side strips of webbing of different rolls. The machine folder has two side-by-side passages to receive the two webs, respectively, the passages having folds to form interleaved accordian pleats in the two running webs extending in the direction of travel thereof. A gang of blades on each side of the interleaved webs extends between the pleats and cuts the nearest web only, forming elongated folded, interleaved, strips of napkin width. A reciprocating saw cuts the interleaved strips on the fly into segments of napkin length.

BACKGROUND OF THE INVENTION

The present invention relates to a machine for folding and cutting running webs of material into small units, such as napkins or facial tissues.

In order to attain a satisfactory rate of production in cutting and folding articles, such as paper napkins, it is advantageous to fold and cut the napkins from continuously running paper. Folding and cutting napkins from continuously running paper becomes much more difficult when it is necessary to fold the napkins in interleaved relationship. This has, however, been accomplished heretofore, as shown, for example, in U.S. Pat. 3,307,844 which is directed toward a method of producing packages of tissues interfolded each with the next so that when the top one is drawn from the stack it carries with it the leading edge of the next tissue beneath it in the stack.

SUMMARY OF THE INVENTION

In the present invention, a simple, effective machine is provided which folds and cuts napkins, facial tissues, or other similar articles, in interleaved relationship, from continuously running webs of material. In brief, in the preferred embodiment of the machine, a folder in the machine receives two running webs of material. Each web is formed from strips of side-by-side webbing off of a plurality of rolls of paper. The folder in the machine comprises a central separating member and two tucking members, one on each side of the separating member. The separating member and the two tucking members define two side-by-side passages, each passage receiving one of the webs, and each passage with folds extending in the longitudinal direction of travel of the web. The two running webs passing through these two passages form two interleaved webs of accordian pleats extending in the direction of travel. At the downstream end of the folder, a gang of blades on one side of the two running webs extends into the pleats just far enough to cut the nearest web. A similar gang of blades on the other side of the two running webs, staggered relative to the first gang of blades, extends into the pleats just far enough to cut the other web. Thus, the two running webs leave the blades as interleaved strips of napkin width. A downstream gang saw cuts these strips into segments of napkin length, producing interleaved, folded napkins.

It is therefore one object of the present invention to fold two running webs into interleaved accordian pleats.

It is another object of the present invention to cut each of two webs, which are folded into interleaved accordian pleats, into continuous strips of desired width. It is yet another object of the present invention to provide a machine for producing stacked, folded, interleaved, sheets of rectangular shape from continuously running webs of material.

DESCRIPTION OF THE PREFERRED EMBODIMENTS

Figure 1:
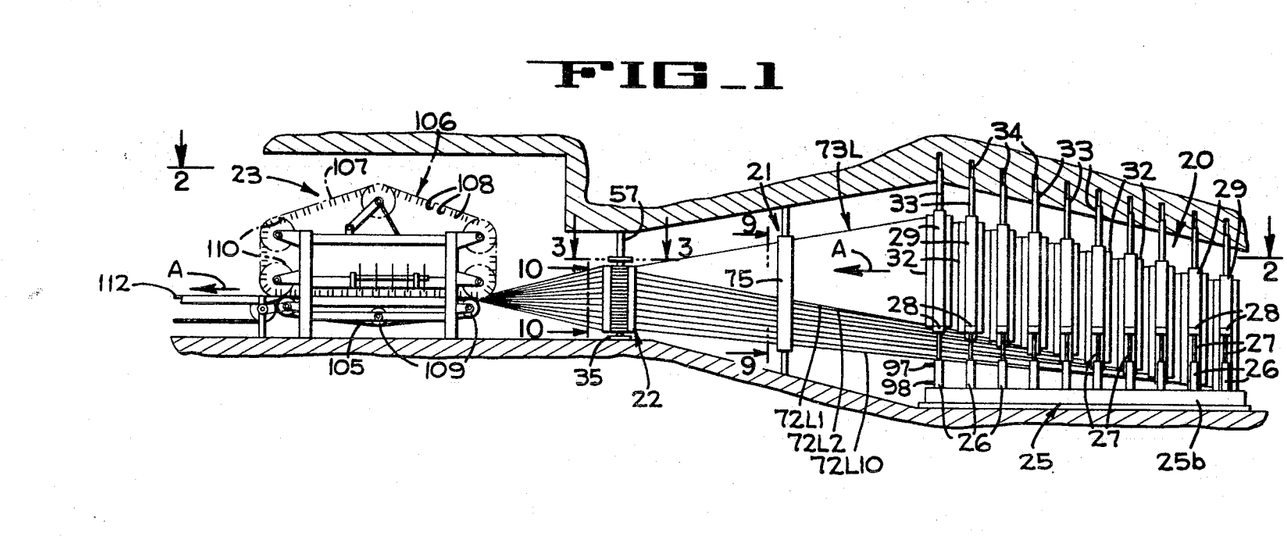
FIG. 1 is a side view in elevation of a machine embodying the present invention.
Figure 2:
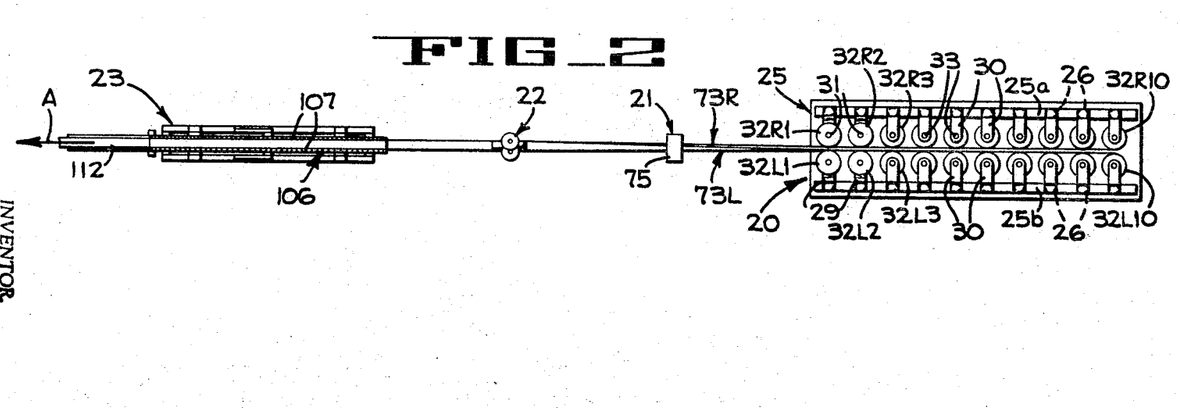
FIG. 2 is a view taken on the line 2—2 of FIG. 1.

There is shown in FIGS. 1 and 2 a paper folding and cutting machine having a paper roll holder indicated generally at 20, web sensing mechanism indicated generally at 21, web folding and slitting mechanism indicated generally at 22, and web cutting mechanism indicated generally at 23.

The roll holder 20 has a base 25 with two parallel spaced pedestals 25a and 25b on which are mounted a plurality of hydraulic cylinders 26. Each cylinder 26 has slidably received therein a piston (not shown) which is connected to a connecting rod 27. The upper end of each connecting rod 27 is secured to a lug 28 on a yoke 29. Each yoke 29 has a pair of vertically spaced horizontal arms 20 which receive therebetween a core 31 of a roll 32 of paper. A guide rod 33 on the upper arm of each yoke is slidably received in an opening 34 in the ceiling. The paper is fed from the inner sides of the rolls and travels along a path through the machine in the directional sense indicated by arrows A. It will be noted from FIG. 2 that the rolls 32 are arranged in pairs which straddle the path the paper travels, the two rolls of each pair being distinguished in the drawings by the suffixes L and R. The pairs of rolls 32 are spaced along the path the paper travels and are distinguished in the drawings by numerical suffixes, following the letter suffixes, indicating their order (from left to right as viewed in FIGS. 1 and 2) along the path of the paper.

Figure 4:
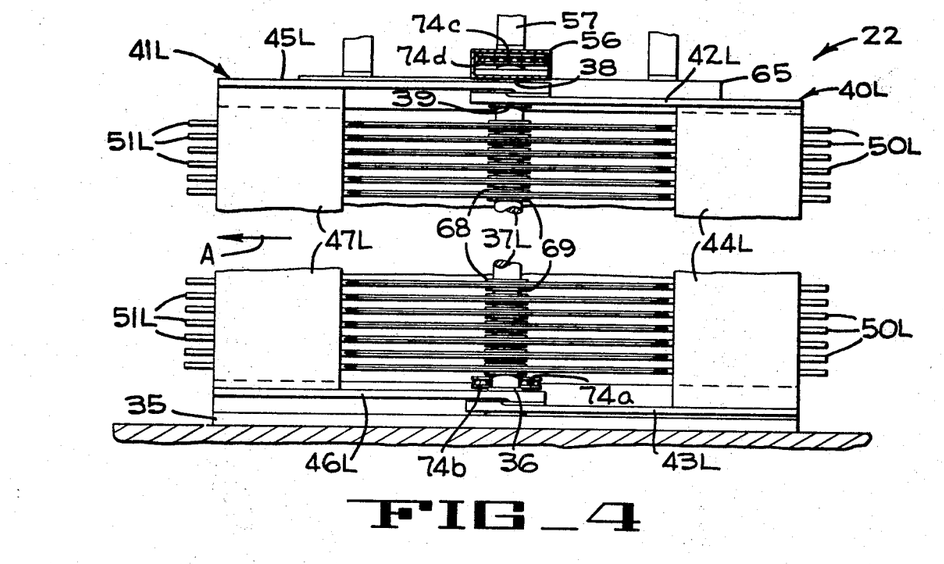
FIG. 4 is a view taken on the line 4—4 of FIG. 3.
Figure 6:
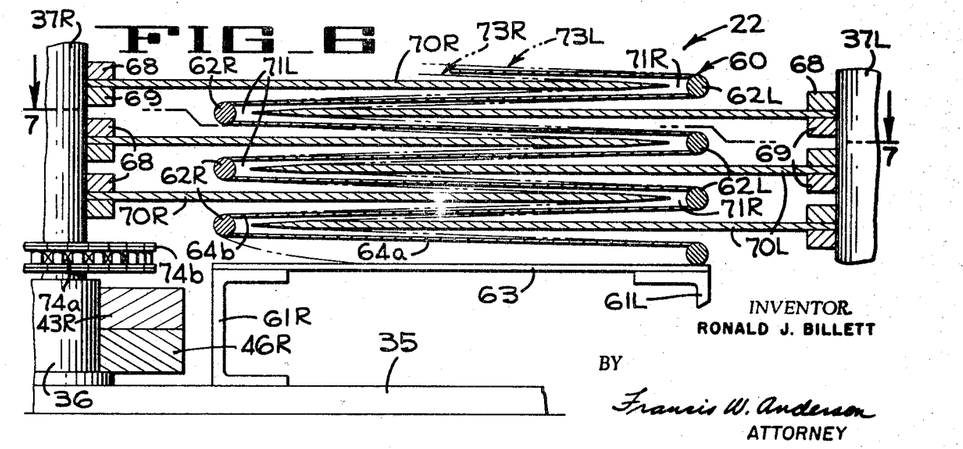
FIG. 6 is a view taken on the line 6—6 of FIG. 3.

As shown best in FIGS. 4 and 6, the web folding and slitting mechanism 22 has a base 35 to which two laterally spaced sleeves 36, are secured. The two sleeves rotatably receive, respectively, the upstanding shafts 37R and 37L. Two tucking members 40R and 41R are pivotally received on shaft 37R, and two similar tucking members 40L and 41L are pivotally received on shaft 37L. The tucking members 40R and 40L each have upper arm 42R, 42L, respectively. The upper arms pivotally received on sleeves 38 which are supported on shafts 37R, 37L, respectively by collars 39. These tucking members also have a lower arm 43R, 43L respectively, pivotally received on the sleeves 36. Each of the tucking members 40R, 40L have a vertical support bar 44R, 44L, respectively, supported between the arms and spaced from shaft 37R and 37L respectively. Similarly, the tucking members 41R, 41L each has an upper arm 45R, 45L, respectively, pivotally received on sleeves 38. The tucking members 41R, 41L also have a lower arm 46R, 46L, respectively, pivotally received on sleeves 36. Each of the tucking members 41R, 41L has a vertical support bar 47R, 47L, respectively, supported between the arms and spaced from the shafts 37R, 37L, respectively.

Figure 3:
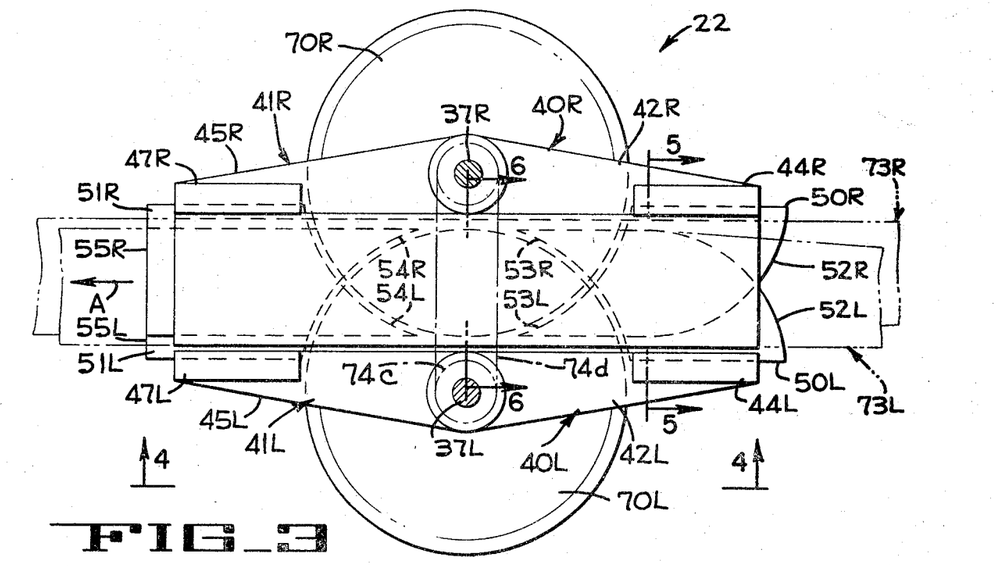
FIG. 3 is a view taken on the line 3—3 of FIG. 1.
Figure 7:
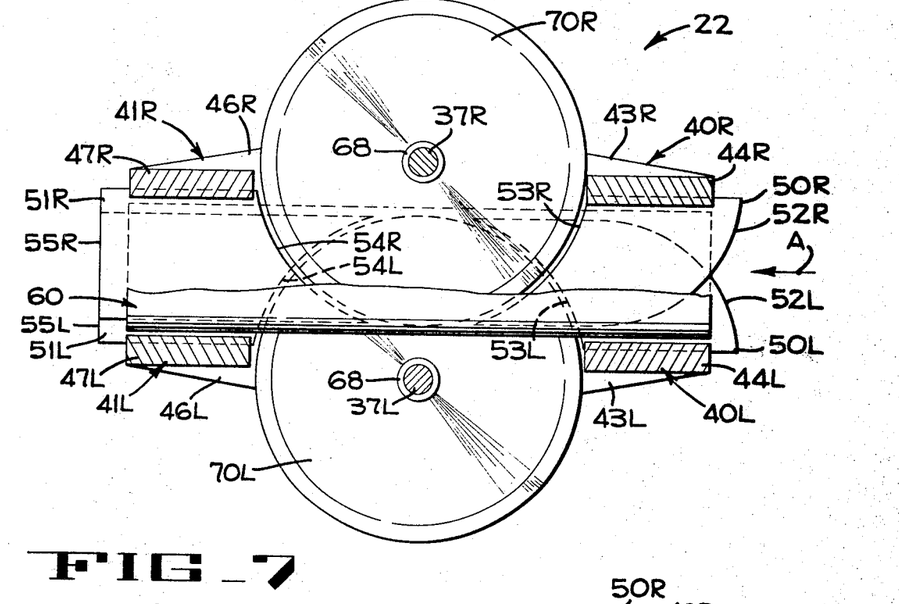
FIG. 7 is a view taken on the line 7—7 of FIG. 6.

Each of the vertical support bars 44R, 44L, 47R, 47L has a plurality of horizontal, vertically spaced, tucking plates 50R, 50L, 51R, 51L respectively, secured thereto. The tucking plates 50R lie in the same horizontal planes as the tucking plates 51R; and the tucking plates 50L lie in the same horizontal planes as the tucking plates 51R; and the tucking plates 50L lie in the same horizontal planes as the tucking plates 51L. The vertically spaced horizontal planes containing the vertically spaced plates 50R and 51R are staggered with respect to the vertically spaced planes containing the vertically spaced plates 50L and 51L, as shown best in FIG. 5. As shown in FIGS. 3 and 7, the tucking plates 50R and 50L have arcuate leading edges 52R and 52L, respectively, (that is, the edges which are first encountered by the traveling paper) and arcuate trailing edges, 53R and 53L, respectively (that is, the edges which are last encountered by the traveling paper). The trailing edges 53R, 53L are circular, about a center in shafts 37R, 37L, respectively. The leading edges 54R, 54L of tucking plates 51R, 51L are circular, having centers in shafts 37R, 37L, respectively. The trailing edges 55R, 55L of tucking plates 51R, 51L are straight and extend transversely to the direction of travel of the paper. The upper ends of shafts 37L, 37R are journaled in a housing 56 which is connected to the ceiling by bracket 57.

Figure 5:
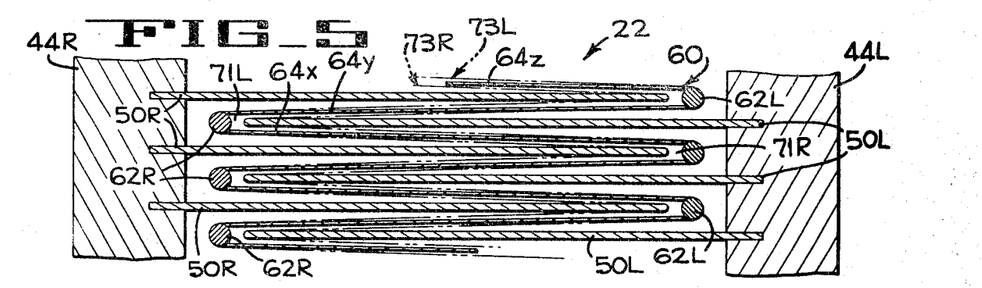
FIG. 5 is a view taken on the line 5—5 of FIG. 3.

A separating member 60 is supported on base 35 by channel members 61R and 61L, as shown in FIG. 6. The separating member has a plurality of straight, vertically spaced, parallel, rods 62R which extend longitudinally (that is, in the direction of paper travel) in the vertically spaced horizontal planes containing the tucking plates 50L, as shown in FIG. 5. The separating member 60 also has a plurality of straight vertically spaced, parallel, rods 62L which extend longitudinally in the vertically spaced horizontal planes containing the tucking plates 50R. When the tucking plates 50L and 51L are swung to a closed operating, position (as shown in FIG. 7), the rods 62R are spaced a short distance from the inner side edge of the plates (near the rear, or trailing edges), as shown in FIG. 5. Similarly, when the tucking plates 50R and 51R are swung to a closed, operating, position (as shown in FIG. 7), the rods 62L are spaced short distance from the inner side edges of the plates (near the rear, or trailing edges), as shown in FIG. 5.

A horizontal plate 63 straddles the channel members 61R, 61L and the lowermost rod 62L is brazed, or otherwise secured, to the upper surface of the plate along one edge thereof, as shown in FIG. 6. A horizontal plate 64a is brazed to the upper surface of the lowermost rod 62L and to the lower surface of the lowermost rod 62R. A similar horizontal plate 64b is connected to the upper surface of the lowermost rod 62R and to the lower surface of the next to lowest rod 62L. In a similar manner, the upper surface of each rod 62L is connected by a horizontal plate to the lower surface of a rod 62R and the upper surface of a rod 62R is connected by a horizontal plate to the lower surface of a rod 62L. Since the rods 62R lie in horizontal planes which are staggered with respect to the horizontal planes in which the rods 62L lie, the plates 64 and the rods 62R and 62L define a member with accordian pleats, or folds, extending in the longitudinal direction. The top horizontal plate 64z is secured to a support 65 depending from the ceiling and passing under housing 56.

As shown best in FIGS. 3 and 6, the shafts 37R and 37L each have horizontal, vertically spaced, circular blades 70R and 70L, respectively, secured thereon by collars 68 and 69 which straddle each blade. It will be noted from FIG. 3 that the tucking plates 50R and 50L (which may be considered as leading tucking plates) are spaced longitudinally from the tucking plates 51R and 51L (which may be considered as trailing tucking plates). The vertically spaced horizontal blades 70R fit between the leading and trailing tucking plates 50R and 51R, lying in the same horizontal plane as these tucking plates. The circular trailing edge of tucking plates 50R and the circular leading edge of tucking plates 51R are concentric with, and closely spaced to, the circular cutting edge of blades 70R when the tucking plates are in their closed, operating position as shown in FIG. 7. Similarly, the vertically spaced horizontal blades 70L fit between the leading and trailing tucking plates 50L and 51L, lying in the same horizontal plane as these tucking plates. Thus, the blades 70R are staggered with respect to the blades 70L, as the tucking plates 50R and 51R are staggered with respect to the tucking plates 50L and 51L. The circular trailing edge of tucking plates 50L and the circular leading edge of tucking plates 51L are concentric with, and closely spaced to, the circular cutting edge of blades 70L when the tucking plates are in their closed, operating position as shown in FIG. 7. The separating member 60 extends continuously from a point near the leading edge of the leading tucking plates to a point near the trailing edge of the trailing plates.

It will be noted (see FIG. 5) that the tucking plates, both in front of and behind the blades 70R, 70L, define with the separating member 60, two side-by-side passages 71R, 71L having accordian folds extending longitudinally (that is, in the direction of travel of the paper). These passages, which are not connected, each receive a running, or traveling, web of paper when the machine is operating.

The rolls of paper stand vertically, and the paper leaves the roll in a vertical plane tangent with the inner edge of the roll. An imaginary straight line on a web of paper passing through either passage, if the line extends longitudinally on the paper, will remain straight, or substantially straight, as the paper passes through the folder and slitter 22. On the other hand, an imaginary straight line extending laterally on the paper (that is, perpendicular to the longitudinal direction) will be straight when it leaves the roll but will fold into a zig-zag line (see FIG. 5) as it passes through the folder and slitter 22. The paper received in one of the passages, such as passage 71R, comes from one of the rolls of a pair, such as roll 32R1, and the paper received in the other of the passages 71L comes from the other roll 32L1 of the pair of rolls.

Figure 9:
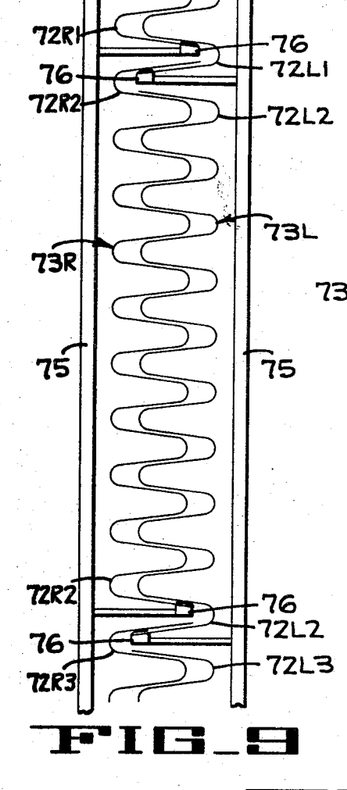
FIG. 9 is a view taken on the line 9—9 of FIG. 1.

If a pair of rolls, such as 32R1 and 32L1, are quite long, and/or the stack of paper units, such as napkins or facial tissues, which is desired, is small, a single pair of rolls 32R1 and 32L1 is sufficient to feed the machine. If, however, a large stack of tissues is desired, many pairs of rolls will be needed, as shown in FIGS. 1 and 2, to feed the machine. The web strips 72R1, 72R2, 72R3 up to 72R10, off rolls 32R1, 32R2, 32R3, up to 32R10, respectively, are fed side-by-side into the passage 71R to define a single web 73R continuous in length (to the extent of the length paper on the rolls) but interrupted in width, as shown in FIG. 9. Similarly, the web strips 71L, 72L, 73L up to 7210L, off of rolls 32L1, 32L2, 32L3, up to 32L10, respectively, are fed side-by-side into the passage 71L to define a single web 73L continuous in length but interrupted in width. The first pair of paper rolls 32R1 and 32L1 are fed into the top of the two passages 71R and 71L, respectively. Subsequent pairs of rolls are fed into progressively lower portions of the passages 71R and 71L. Accordingly, the pairs of rolls are supported in progressively lower positions, as shown in FIG. 1, to minimize interference between the web strips off the different rolls. It will be noted that the lug 28, to which connecting rod 27 is connected is positioned progressively higher on the yokes 29 to achieve the progressively changing height at which the rolls are supported.

A vertical support 75, straddling the path of the webs of paper as they leave the rolls, has a plurality of sensing heads 76 mounted thereon, one for each web strip of paper (72R1 to 72R10 and 72L1 to 72L10) or two for each pair of webs of paper, from the rolls. In other words, a sensing head 76 is provided for each of the twenty rolls of paper shown in FIGS. 1 and 2. A source 77 of air under pressure is connected by lines 78, 79, respectively to two pressure regulating valves 80, 81. Valve 80 has a movable valve member 80a urged to the left by spring 80b. The amount of air from line 78 passing through the valve into line 82 is controlled by the position of valve member 80a. Line 82 is connected to chamber 80c and the pressure in the chamber urges the valve member to the right. Any increase in pressure in line 82 results in movement of valve member 80a to the right, thereby reducing the input to the valve and consequently reducing the pressure in line 82. Thus, with a given setting of the spring (which can be adjusted by screw 80d) and a given setting of the opening to the atmosphere (through needle valve 84) the pressure in line 82 will remain constant if the escape of air through line 86 remains constant. The pressure valve 81 and needle valve 85, which are connected by line 83, are identical to the valves 80 and 84. The line 82 is connected by line 86 to one of the sensing heads 76, which has a passage 87 therethrough terminating at an elongated slot 88 extending in the direction of paper travel. The sensing head 76, and slot 88 therein, are positioned at the edge of a properly positioned web strip of paper (such as web strip 72L1 off roll 32L1), with the paper covering a part, say one half, of the slot. A clip 89 on the head guides the paper to run close to the slot. The slot defines an orifice through which air from line 82 escapes.

Figure 11:
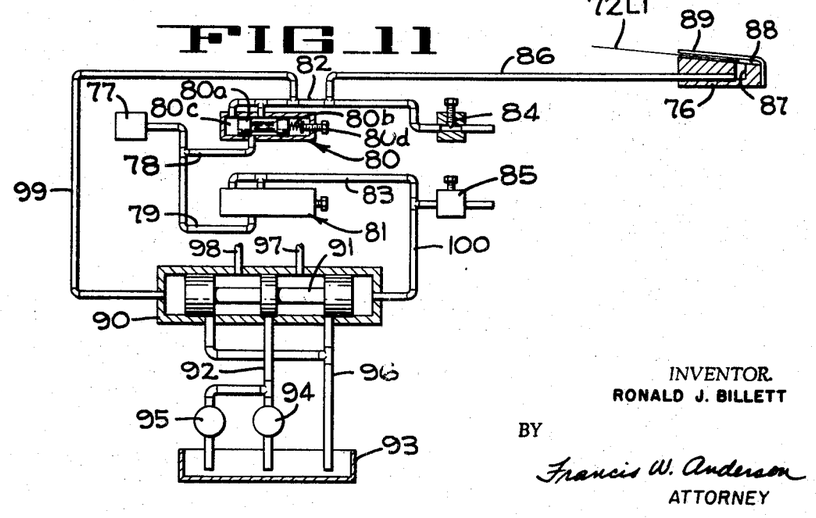
FIG. 11 is a schematic diagram of hydraulic and pneumatic circuitry in the machine of FIG. 1.

A hydraulic valve 90 has a freely movable valve member 91 therein. A pressure line 92, supplied from fluid sump 93 through pump 94, is connected to a pressure port in the valve. A relief valve 95 is connected to line 92 for the relief of excessive pressure therein. A return line 96, connected to two discharge ports in the valve, leads to the sump. Two motor lines 97, 98 are connected between two motor ports in the valve and the upper and lower ends, respectively, of one of the cylinders 26 which controls the vertical position of one of the paper rolls (such as 32L1). One end of valve 90 is connected by air line 99 to air line 82, and the opposite end of valve 90 is connected by air line 100 to air line 83. A similar web sensing system and paper roll control, which has been used before, is provided for each roll of paper feeding the machine.

The air flowing in line 83, from pressure regulating valve 81, out through restriction 85 to atmosphere, will establish a given pressure in line 83 which is communicated through line 100, to one end of valve 90. Air flowing from pressure regulating valve 80 through line 82 and out through restriction 84, and out line 86 through orifice 88, will establish a given pressure in line 82 when the web of paper is properly positioned with respect to orifice 88. This pressure, which equals the pressure in line 83, will be communicated to the other end of the valve through line 99. With the pressures at both ends of valve member 91 balanced, valve member 91 will be center, as shown, to block the pressure ports and the discharge ports of the valve.

If the web of paper starts to creep up, more air escapes through orifice 88, and the pressure in line 82, and the pressure in the left end (as viewed in FIG. 11) of valve 90, drops, shifting valve member 91 to the left. Fluid under pressure from line 92 flows through line 97 to the upper end of the cylinder 26, controlling the roll of paper which supplies the web passing the sensing head. At the same time, line 98 is connected through the valve to return line 96, and the rolls of paper is lowered until the web again covers the orifice 88 to balance the pressure at both ends of the valve 90. Conversely, if the web of paper 72L creeps down to block the orifice 88, the pressure in line 82 will rise and valve member 91 will be shifted to the right (as viewed in FIG. 11). Motor line 98 will then be connected to pressure and motor line 97 will be connected to exhaust to raise the paper roll from which web 72L1 comes, thus opening the orifice 88 and restoring the pressure balance on the ends of valve 90. It should be noted that insofar as the present invention is concerned, any web sensing apparatus which can maintain the web on a true course can be used.

Since the passages 71R and 71L have accordian folds extending in the longitudinal direction, the two webs 73R and 73L are folded into accordian pleats of zig-zag crosssection (see FIG. 5) as they run through the leading end of the folder and slitter 22. Since the passages 71R and 71L are side-by-side, the two webs are interleaved (see FIG. 5) as they pass through the leading end of the folder and slitter 22.

Thus, the two webs pass through the leading end of the folder and slitter 22 in spaced, side-by-side, relation, folded into interleaving pleats. Alternate pleats open to opposite sides. The tucking plates 50R extend from one side between the pleats (as shown in FIG. 5), engaging the web 73R at the inner edges of plates 50R. The arcuate leading edges of the tucking plates 50R engage and guide the web 73R into the fully folded position shown in FIG. 5. Similarly, the tucking plates 50L, which are staggered with respect to the tucking plates 50R, extend from the opposite side between the alternate pleats, engaging the web 73L at the inner edges of plates 50L. The arcuate leading edges of the tucking plates 50L engage and guide the web 73L into the fully folded position shown in FIG. 5. The webs 73R and 73L are folded to a width corresponding to the width of the desired unit, such as the napkin or facial tissue.

The shaft 37R has at its lower end, a sprocket 74a mounted thereon which receives a chain 74b driven by a motor (not shown). A sprocket on the upper end of shaft 37R is connected to a similar sprocket 74c on the upper end of shaft 37L by a chain 74d. hus, both shafts are driven from the same source to rotate the blades 70R and 70L.

The vertically spaced blades 70R, which are concentric with the trailing edges of plates 50R (when the plates are in operating position) and closely spaced thereto, lie in the same horizontal planes as the leading tucking plates 50R. The blades 70R, which are also concentric with the leading edges of the trailing tucking plates 51R (when the plates are in operating position), also lie in the same horizontal planes as the plates 51R. As the web 73R leaves the trailing edges of the tucking plates 50R, the pleats which open to the right (as viewed in the direction of travel of the paper) and which previously had received the plates 50R, receive instead the blades 70R. Similarly, the vertically spaced blades 70L, which are concentric with the trailing edges of plates 50L and the leading edges 51L (when the plates are in operating position), lie in the same planes as these plates. Thus, as web 73L leaves the trailing edges of the tucking plates 50L, the pleats which open to the left (as viewed in the direction of travel of the paper) and which previously had received plates 50L, receive instead the blades 70L.

Figure 10:
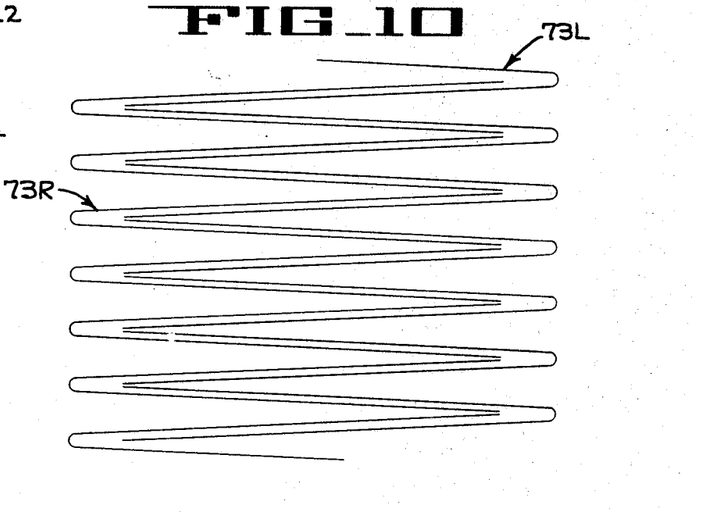
FIG. 10 is a view taken on the line 10—10 of FIG. 1.

The blades 70R, 70L extend inwardly approximately to the same extent as the tucking plates (or very slightly more) to cut the near web (73R, 73L, respectively) only. In other words, the blades 70R extend into passage 71R and cut web 73R into elongated (or continuous) folded strips of desired napkin width (each strip having a single longitudinal fold), and the blades 70L extend into passage 71L and cut web 73L into elongated (or continuous) folded strips (each strip having a single longitudinal fold) which are interleaved with the folded strips cut by blades 70R, as shown in FIG. 10.

After the continuous, folded, interleaved strips of napkin width leave the blades, they pass through the trailing end of the folder and slitter 22 into a reciprocating saw machine 23 for cutting the continuous strips into segments of desired napkin length. The saw 23 reciprocates in and transverse to the direction of web travel. Insofar as the present invention is concerned, any machine which can cut running strips into segments of desired length can be used. The machine shown for illustrative purposes, which is described more fully in U.S. Pat. 3,288,009, reissued Nov. 29, 1966 to J. J. Bradley, receives the strips of paper between two flexible, endless members, 105 and 106. Member 105 is a flexible web having crossbars and member 106 comprises two spaced endless chains 107 connected by U-shaped bridge members 108. These members 105, 106 are power driven about sprockets 109, 110 respectively and run side-by-side along a path past the reciprocating blades 111. The continuous, folded, interleaved, strips of paper are received between members 105, 106 and are compressed thereby. The compressed continuous strips are driven (that is, continuously pulled) with sufficient force to pull the paper off the rolls, the cores of which are easily rotatable. Alternately, the rolls of paper may be rotated by power means, and the pull of the web cutting mechanism 23 can be reduced to a magnitude which merely keeps the webs taut. As the strips of paper pass the reciprocating blades, they are cut on the fly into segments of napkin length and discharged out the trailing end of the paper cutter 23 onto the power driven conveyor table 112 for packaging.

Figure 12:
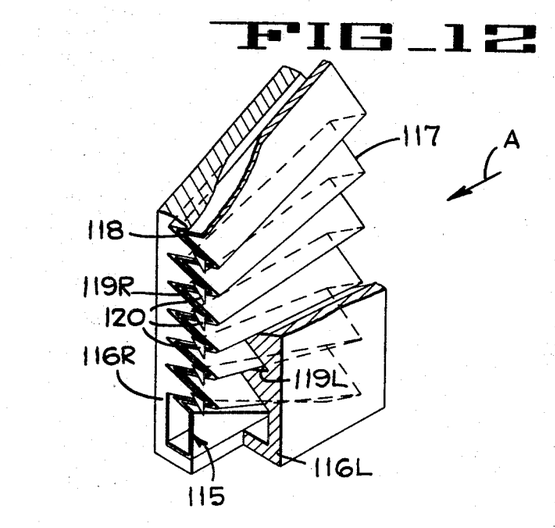
FIG. 12 is a view in perspective of an alternate construction of the web folding and slitting mechanism.

There is shown in FIG. 12 an alternate construction of a material folder and slitter to replace the unit 22. In this alternate construction, there is a central separating member 115, and tucking members 116L and 116R on either side. The central member 115 constitutes a member of zig-zag cross-section, with longitudinally extending folds, which spread fan-like toward the leading edge 117. In other words, the ridges and valleys of the zig-zag web are further apart, or more open, at the leading edge than at the trailing edge 118. The side tucking members also having ridges and valleys which are complementary to the ridges and valleys they face on the central separating member. Thus the three members 115, 116L and 116R define two side-by-side longitudinally extending passages 119R and 119L of zig-zag cross-section comprising longitudinal accordian folds to receive two webs, respectively. The two passages open, fan-like, as they extend toward the end of the passages first encountered by the moving webs to more gradually guide the webs into folded, interleaved, relationship. As the webs pass through the folding and slitting member, they are folded (by virtue of the passages of zig-zag cross-section) and interleaved (by virtue of the side-by-side passages). Knives 120 are secured at the trailing edge of the tucking members 116R and 116L to slit the nearest web only, cutting the two webs into continuous, folded, interleaved strips of napkin width.

Figure 8:
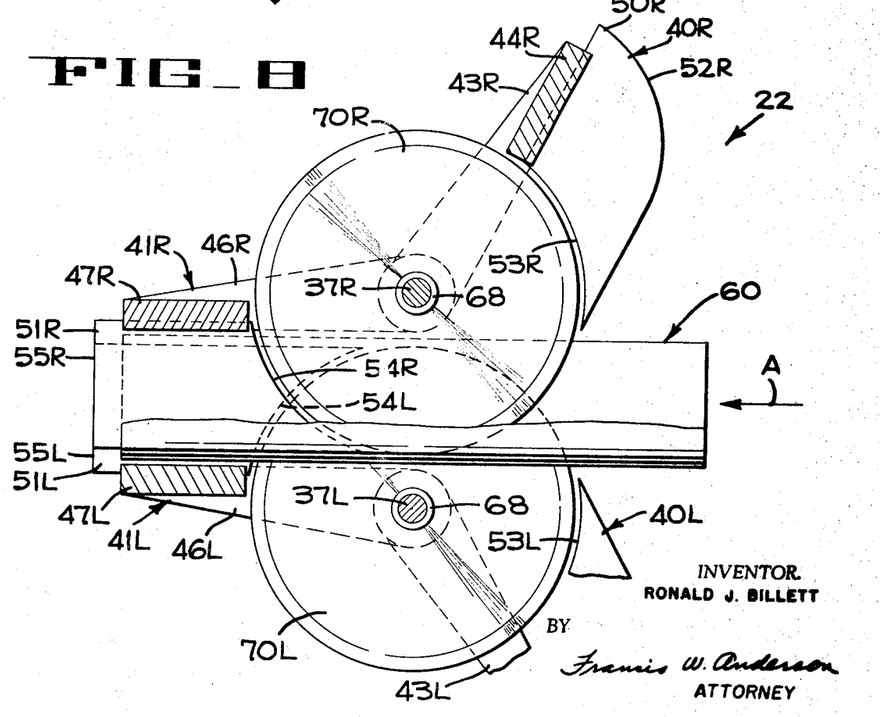
FIG. 8 is a view taken as the view of FIG. 7 but with the tucking members spread apart for threading webs of paper into the machine.

In operation of the machine shown in FIGS. 1 and 2, the separate webs 72R1 to 72R10 are threaded side-by-side into the passage 71R in the guide housing defined by the tucking members 40R, 40L, 41R, 41L and the separating member 60. Similarly the separate webs 72L1 to 72L10 are threaded side-by-side into the passage 71L. For this purpose, the leading and trailing tucking members 40R, 40L, 41R, 41L can be swung outwardly (at the tucking members 40R, 40L of FIG. 8) to receive the webs, and then closed to a normal operating position to fold and interleave the continuous web strips. The continuous, folded, interleaved, strips are then fed into the paper cutting machine 23, which, when operated to rotate members 105, 106, will pull the paper through the entire machine, thus providing the power to rotate the rolls and feed the paper therefrom. Alternately, torque can be applied directly to the rolls by an electric motor and belt or chain drive.

Once the paper is started through the machine, the machine runs continuously, slitting the paper into continuous strips of napkin width and severing the continuous strips into segments of napkin length, to continuously discharge stacks of folded, interleaved napkins, until the rolls are exhausted.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same.

I claim:

1. Mechanism for producing interleaved sheets of material from two webs moving in a longitudinal direction, the combination comprising a guide housing having two side-by-side passages to receive, respectively, the moving webs, said passages having folds extending in said longitudinal direction to define accordian pleats in each web, said accordian pleats interleaved and spaced apart as the webs pass through the guide housing, a gang of spaced apart blades on one side of said webs extending transversely between said interleaved pleats to cut one of said webs only, and a gang of spaced apart blades on the other side of said webs extending transversely between said interleaved pleats to cut the other of said webs only.

2. The apparatus of claim 1 in which the folds of the passages open as they extend toward the end of the passages first encountered by the moving webs.

3. A material folder to fold a first and a second running web of flexible material in interleaved relationship, the combination comprising: a separating member having accordian folds, a first tucking member on one side of said separating member, said first tucking member having projections extending into the accordian folds on said one side of said separating member, said separating member and said first tucking member receiving said first running web therebetween to fold the web into accordian pleats, a second tucking member on the other side of said separating member, said second tucking member having projections extending into the accordian folds on said other side of said separating member, said separating member and said second tucking member receiving said second running web therebetween to fold the web into accordian pleats interleaved with the accordian pleats of said first moving web, and a cutting mechanism including a first gang of blades aligned with the projections on said first tucking member to extend between the pleats of said first web for cutting said first web and a second gang of blades aligned with the projections on said second tucking member to extend between the pleats of said second web for cutting said second web.

4. The mechanism of claim 3 in which said gangs of blades are positioned on the downstream ends of said tucking members.

5. The mechanism of claim 4 in which a third tucking member has projections aligned with the blades of said first gang of blades and a fourth tucking member has projections aligned with the blades of said second gang of blades, said third and fourth tucking members adjacent said first and second gangs of blades and opposite said first and second tucking members.

6. The mechanism of claim 3 in which said first and second gang of blades has a blade aligned with each projection of said first and second tucking members, respectively.

7. The mechanism of claim 3 in which each gang of blades comprises a plurality of parallel circular rotatable blades.

8. The mechanism of claim 3 in combination with a saw downstream from said gangs of blades, said saw movable transversely to cut across said interleaved webs on the fly.

9. Apparatus for folding and cutting material comprising:
 (a) means to support rolls of material,
 (b) means for drawing two webs of material from said rolls,
 (c) means to fold said two webs into interleaved accordian pleats,
 (d) means for cutting said pleated webs comprising a first gang of blades extending into the pleats on one side of said webs, said blades of the first gang extending just far enough to cut only one of said webs into strips, and
 (e) a second gang of blades in staggered relation to the first gang of blades, said second gang of blades extending into the pleats on the other side of said webs, said blades of the second gang extending just far enough to cut only the other of said webs into strips.

10. The apparatus of claim 9 in combination with a saw reciprocable in the direction of travel of said webs to cut said web strips into segments.

11. Apparatus for producing interleaved stacks of rectangular sheets from rolls of web material comprising:
 (a) means supporting at least two rolls of said material for unwinding,
 (b) means for simultaneously unwinding the web from each of said rolls to define a pair of running webs,
 (c) means for folding said running webs into interleaved but spaced apart accordian pleats,
 (d) a first gang of blades extending into the pleats on one side of said webs, said blades on the first gang extending just far enough to cut only one of said webs into continuous strips of desired width,
 (e) A second gang of blades in staggered relation to the first gang of blades, said second gang of blades extending into the pleats on the other side of said webs, said blades of the second gang extending just far enough to cut only the other of said webs into continuous strips, and
 (f) a gang saw reciprocable in the direction of travel of said web strips to cut said continuous web strips into segments of desired length.

12. Apparatus for producing interleaved stacks of rectangular sheets from rolls of web material comprising:
 a pair of paper rolls supported on rotatable shafts,
 (a) means for simultaneously unwinding said rolls to supply a pair of traveling webs,
 (b) said traveling webs being received by means to fold the web from each roll into longitudinally extending interleaved folds,
 (c) means to cut one of said webs on one side of said interleaved webs at each interior fold thereof and means to cut the other of said webs on the other side of said interleaved webs at each interior fold thereof to define continuous interleaved strips each with a single longitudinally extending fold,
 (d) means to compress said strips, and
 (e) means to cut said strips laterally into segments.

13. Apparatus for producing interleaved stacks of rectangular sheets from rolls of web material comprising:
 (a) means to support a pair of rolls to supply a pair of running webs fed from the rolls,
 (b) means for folding the running webs of paper from said rolls into oppositely opening longitudinally extending interleaved folds,
 (c) two gangs of knife blades associated with said folding means, one on each side of said interleaved webs and each positioned to cut one of said running webs only as the interleaved folds pass the blades,
 (d) means to compress said webs, and
 (e) means to cut said webs laterally into segments.

14. A method of folding and cutting webs to produce interfolded web strips comprising the steps of accordian pleating two adjacent webs so that the creases extend substantially parallel to the web edges and respective creases in each web are laterally spaced, and cutting alternate creases of each web while folded to produce the mentioned interfolded web strips.

15. The method of folding and cutting according to claim 14 further comprising the step of continually drawing the webs from the web rolls to effect said pleating and cutting.

16. The method of folding and cutting according to claim 14 further comprising the steps of compacting the interfolded web strips, and cutting such strips while compacted to a desired length to produce a stack of interfolded tissues, napkins or towels.

References Cited

UNITED STATES PATENTS

| 2,039,335 | 5/1936 | Pall | 270—86 X |
| 3,236,129 | 2/1966 | Bishop | 83—425 X |

FOREIGN PATENTS

| 142,121 | 9/1953 | Sweden. |

EUGENE R. CAPOZIO, Primary Examiner

P. V. WILLIAMS, Assistant Examiner

U.S. Cl. X.R.

83—425

PO-1050
(5/69)

UNITED STATES PATENT OFFICE
CERTIFICATE OF CORRECTION

Patent No. 3,536,317          Dated October 27, 1970

Inventor(s) R. J. BILLETT

It is certified that error appears in the above-identified patent and that said Letters Patent are hereby corrected as shown below:

| | |
|---|---|
| Column 2, line 43: | change "20" to --30--; |
| line 65: | insert after "arms" --are--. |
| Column 3, lines 14-15: | delete "51R; and the tucking plates 50L lie in the same horizontal planes as the tucking plates 51L." |
| Column 3, line 44: | after "closed" insert --,--. |
| Column 6, line 42: | change "hus" to --Thus--. |

Signed and sealed this 16th day of November 1971.

(SEAL)
Attest:

EDWARD M. FLETCHER, JR.
Attesting Officer

ROBERT GOTTSCHALK
Acting Commissioner of Patents